US008298689B2

(12) United States Patent
Sonobe et al.

(10) Patent No.: US 8,298,689 B2
(45) Date of Patent: Oct. 30, 2012

(54) METHOD OF MANUFACTURING A PERPENDICULAR MAGNETIC RECORDING MEDIUM

(75) Inventors: Yoshiaki Sonobe, Shinjuku-ku (JP); Kong Kim, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 114 days.

(21) Appl. No.: 12/602,430

(22) PCT Filed: May 30, 2008

(86) PCT No.: PCT/JP2008/060053
§ 371 (c)(1),
(2), (4) Date: Nov. 30, 2009

(87) PCT Pub. No.: WO2008/149813
PCT Pub. Date: Dec. 11, 2008

(65) Prior Publication Data
US 2010/0196741 A1 Aug. 5, 2010

(30) Foreign Application Priority Data

May 31, 2007 (JP) .................................. 2007-146330

(51) Int. Cl.
*G11B 5/66* (2006.01)
(52) U.S. Cl. .................................................... 428/831.2
(58) Field of Classification Search .................. None
See application file for complete search history.

(56) References Cited

U.S. PATENT DOCUMENTS

| 2004/0247945 A1* | 12/2004 | Chen et al. ............. 428/694 TS |
| 2005/0255337 A1* | 11/2005 | Mukai ......................... 428/831 |
| 2007/0248844 A1* | 10/2007 | Tomiyasu et al. ............ 428/828 |
| 2009/0034119 A1* | 2/2009 | Takahashi et al. ............ 360/110 |
| 2009/0081483 A1* | 3/2009 | Sonobe et al. ................. 428/828 |

FOREIGN PATENT DOCUMENTS

| JP | 7-334832 A | 12/1995 |
| JP | 11-185236 A | 7/1999 |
| JP | 2002-183927 A | 6/2002 |
| JP | 2002-197630 A | 7/2002 |
| JP | 2002-216338 A | 8/2002 |
| JP | 2003-036525 A | 2/2003 |
| JP | 2003-077122 A | 3/2003 |
| JP | 2003-151128 A | 5/2003 |
| JP | 2003-217107 A | 7/2003 |

* cited by examiner

*Primary Examiner* — Holly Rickman

(57) ABSTRACT

[PROBLEMS] To provide a process for producing a magnetic recording medium, which can simultaneously realize increased high recording density, high impact resistance, and prevention of corrosion, by providing an underlayer which, even when formed at a low gas pressure, can exhibit a high level of coercive force.
[MEANS FOR SOLVING PROBLEMS] A process for producing a perpendicular magnetic recording medium, comprising the step of forming a nonmagnetic underlayer (18) having a granular structure, in which crystal particles are grown in a column form, on a substrate, and forming a magnetic recording layer (20) having a granular structure in which magnetic particles are grown in a column form. The process is characterized in that the underlayer (18) is any one of CoCr or CoCrX (wherein X is a nonmagnetic material), CoCr-oxide, and CoCrX-oxide, and the film forming gas pressure of the underlayer (18) is not more than 4 Pa.

9 Claims, 5 Drawing Sheets

|  | Composition | | | Gas Pressure (Pascal) | | | Magnetic Property | Impact Resistance | Evaluation |
|---|---|---|---|---|---|---|---|---|---|
|  | Orientation Control Layer | 2nd Orientation Control Layer | Underlayer | Orientation Control Layer | 2nd Orientation Control Layer | Under-layer | Hc [Oe] | Pin On pass count |  |
|  | fcc | Amorphous | hcp | fcc | Amorphous | hcp |  |  |  |
| Comparative Example 1 | NiW10 | - | Ru | 0.6 | - | 0.5 | 2273 | 550 | × |
| Comparative Example 2 | ↑ | - | Ru | ↑ | - | 1.5 | 2911 | 500 | × |
| Comparative Example 3 | ↑ | - | Ru | ↑ | - | 3.0 | 3685 | 450 | × |
| Comparative Example 4 | ↑ | - | Ru | ↑ | - | 4.8 | 4315 | 390 | × |
| Comparative Example 5 | ↑ | - | Ru | ↑ | - | 6.0 | 4500 | 350 | × |
| Example 1 | Ti | Carbon | CoCr40 | 0.6 | 0.6 | 0.1 | 4063 | 600 | ○ |
| Example 2 | ↑ | ↑ | ↑ | ↑ | 0.6 | 0.4 | 4938 | 570 | ○ |
| Example 3 | ↑ | ↑ | ↑ | ↑ | 0.6 | 0.7 | 5154 | 540 | ○ |
| Example 4 | ↑ | ↑ | ↑ | ↑ | 0.6 | 2.6 | 4571 | 470 | ○ |
| Comparative Example 6 | ↑ | ↑ | ↑ | ↑ | 0.6 | 4.2 | 4038 | 380 | × |
| Comparative Example 7 | ↑ | ↑ | ↑ | ↑ | 0.6 | 5.9 | 3442 | 350 | × |
| Example 5 | ↑ | - | ↑ | ↑ | - | 0.4 | 4282 | 560 | ○ |
| Example 6 | NiW10 | - | ↑ | 0.6 | - | 1.0 | 4642 | 520 | ○ |
| Example 7 | ↑ | Carbon | ↑ | 0.6 | - | 1.0 | 3800 | 510 | ○ |

FIG. 2

(a)
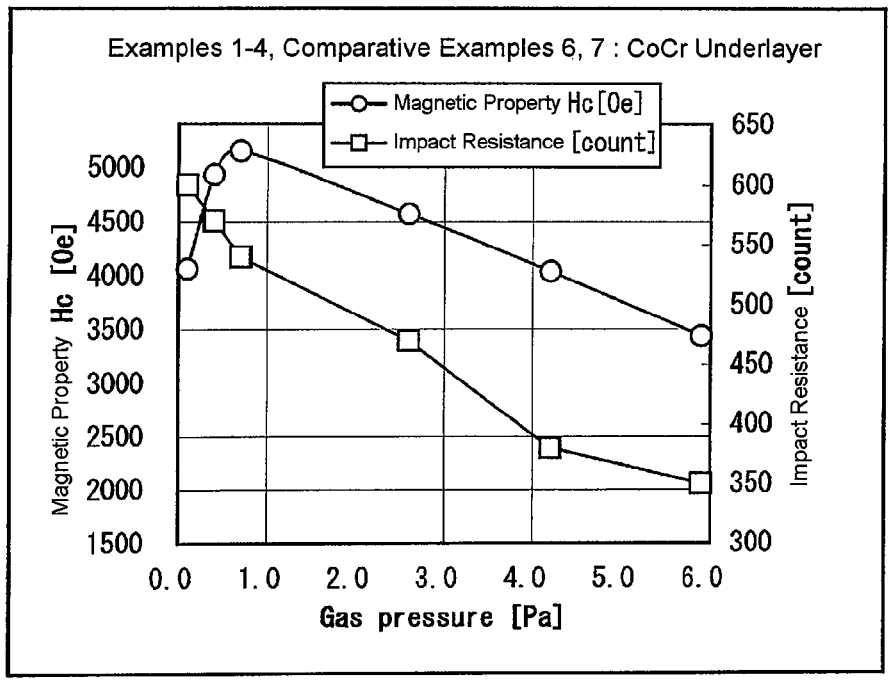
(b)
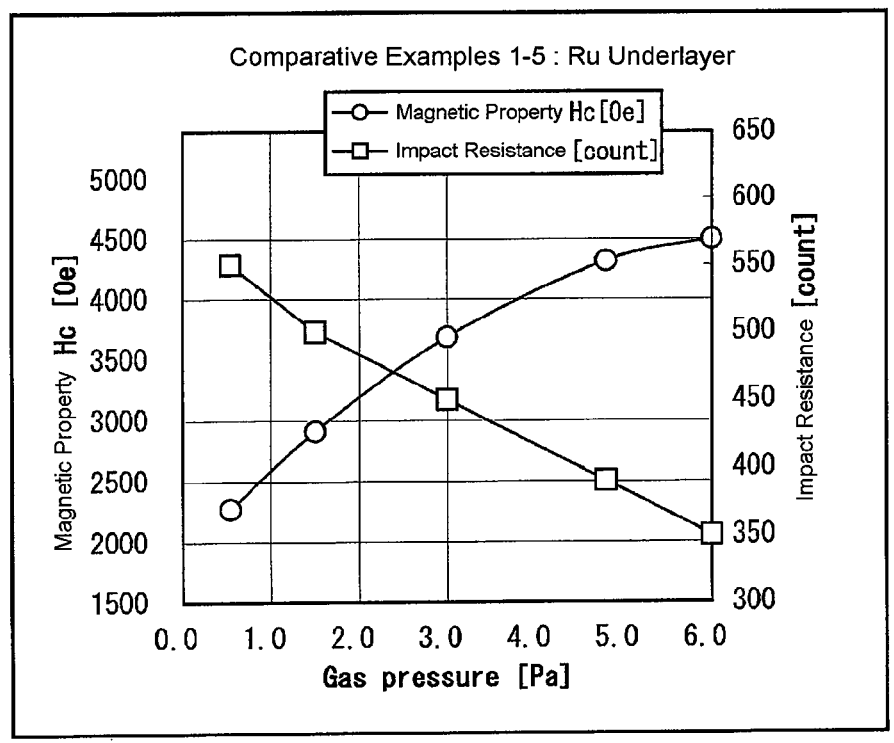
FIG. 3

| | Composition | | | Gas Pressure (Pascal) | | | Magnetic Property | Impact Resistance | Evaluation |
|---|---|---|---|---|---|---|---|---|---|
| | Orientation Control Layer | 2nd Orientation Control Layer | Underlayer | Orientation Control Layer | 2nd Orientation Control Layer | Under-layer | Hc [Oe] | Pin On pass count | |
| | fcc | Amorphous | hcp | fcc | Amorphous | hcp | | | |
| Example 10 | NiW10 | - | CoCr55 | 0.6 | - | 2 | 4677 | 480 | ○ |
| Example 11 | ↑ | - | CoCr40 | ↑ | - | ↑ | 4554 | 490 | ○ |
| Comparative Example 8 | ↑ | - | CoCr35 | ↑ | - | ↑ | 1301 | 470 | × |
| Example 12 | NiW10 | - | CoCr40Ru10 | ↑ | - | ↑ | 3866 | 480 | ○ |
| Example 13 | CuW10 | - | CoCr40 | ↑ | - | ↑ | 3899 | 480 | ○ |
| Example 14 | ↑ | - | CoCr40Ru10 | ↑ | - | ↑ | 3866 | 480 | ○ |

FIG. 4

(a)
Underlayer is Single Layer

| | Composition | | Gas Pressure (Pascal) | | Magnetic Property | Impact Resistance |
|---|---|---|---|---|---|---|
| | Orientation Control Layer | Underlayer | Orientation Control Layer | Underlayer | Hc [Oe] | Pin On pass count |
| | fcc | hcp | fcc | hcp | | |
| Example 15 | NiW10 | CoCr40-SiO2(6mol%) | 0.6 | 0.7 | 5350 | 530 |
| Example 16 | ↑ | CoCr40-TiO2(6mol%) | ↑ | ↑ | 5210 | 540 |
| Example 17 | ↑ | CoCr40-Cr2O3(6mol%) | ↑ | ↑ | 5200 | 530 |

(b)
Underlayer is Two Layers

| | Composition | | | Gas Pressure (Pascal) | | | Magnetic Property | Impact Resistance |
|---|---|---|---|---|---|---|---|---|
| | Orientation Control Layer | 1st Underlayer | 2nd Underlayer | Orientation Control Layer | 1st Underlayer | 2nd Underlayer | Hc [Oe] | Pin On pass count |
| | fcc | hcp | hcp | fcc | hcp | hcp | | |
| Example 18 | NiW10 | CoCr40 | CoCr40-SiO2(6mol%) | 0.6 | 0.7 | 0.7 | 5500 | 530 |
| Example 19 | ↑ | CoCr40 | CoCr40-TiO2(6mol%) | ↑ | ↑ | ↑ | 5370 | 540 |
| Example 20 | ↑ | CoCr40 | CoCr40-Cr2O3(6mol%) | ↑ | ↑ | ↑ | 5300 | 530 |

(c)

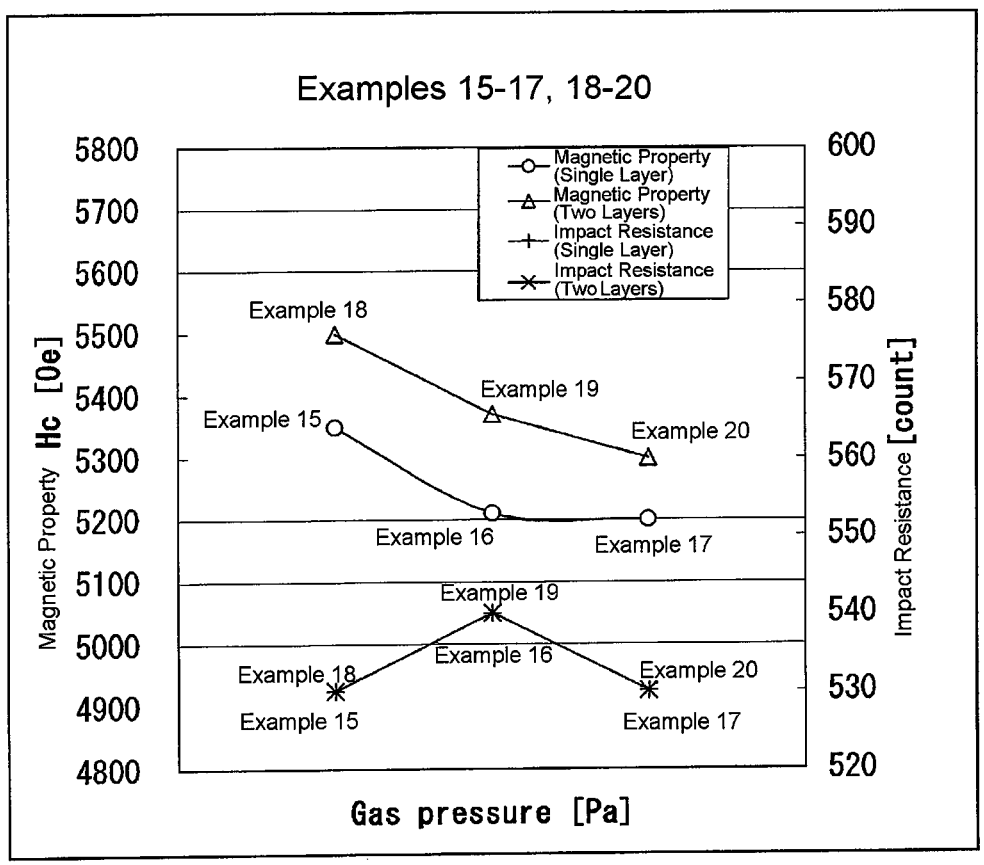

FIG. 5

METHOD OF MANUFACTURING A PERPENDICULAR MAGNETIC RECORDING MEDIUM

TECHNICAL FIELD

This invention relates to a method of manufacturing a perpendicular magnetic recording medium adapted to be mounted in a HDD (hard disk drive) of the perpendicular magnetic recording type or the like.

BACKGROUND ART

Various information recording techniques have been developed with increase in volume of information processing in recent years. Particularly, the areal recording density of HDDs (hard disk drives) using the magnetic recording technique has been increasing at an annual rate of about 100%.

In order to achieve the high recording density in a magnetic disk for use in a HDD or the like, it is necessary to reduce the size of magnetic crystal grains forming a magnetic recording layer serving to record information signals, and further, to reduce the thickness of the layer. However, in the case of conventionally commercialized magnetic disks of the in-plane magnetic recording type (also called the longitudinal magnetic recording type or the horizontal magnetic recording type), as a result of the reduction in size of magnetic crystal grains, there has arisen a so-called thermal fluctuation phenomenon where the thermal stability of recorded signals is degraded due to superparamagnetism so that the recorded signals are lost. This has thus become an impeding factor for the increase in recording density of the magnetic disks. In order to solve this impeding factor, magnetic disks of the perpendicular magnetic recording type have been proposed in recent years.

In the case of the perpendicular magnetic recording type, differing from the case of the in-plane magnetic recording type, the easy magnetization axis of a magnetic recording layer is adjusted so as to be oriented in a direction perpendicular to a surface of a substrate. As compared with the in-plane magnetic recording type, the perpendicular magnetic recording type can suppress the thermal fluctuation phenomenon and thus is suitable for increasing the recording density.

When the magnetic recording layer has a hcp structure (hexagonal closest packed structure) in the perpendicular magnetic recording type, the easy magnetization axis is in a c-axis direction so that it is necessary to orient the c-axis in the normal direction of the substrate. In order to improve the orientation of the c-axis, it is effective to provide a nonmagnetic underlayer with a hcp structure under the magnetic recording layer as shown in Patent Document 1 (JP-A-2003-77122).

Further, in the perpendicular magnetic recording type, it is possible to improve the S/N ratio (Signal/Noise Ratio) and the coercive force Hc by forming the magnetic recording layer into a granular structure in which a nonmagnetic substance (mainly an oxide) is segregated between magnetic grains to form grain boundary portions, thereby isolating and miniaturizing the magnetic grains. Patent Document 2 (JP-A-2003-217107) describes a structure in which magnetic grains are epitaxially grown to form a columnar granular structure.

In the perpendicular magnetic recording type, an underlayer called an orientation control layer is provided for improving the crystal orientation of the magnetic recording layer. Ti, V, Zr, Hf, or the like is known as the orientation control layer, but as shown in Patent Document 3 (JP-A-H07-334832), it is known that particularly Ru (ruthenium) can effectively improve the crystal orientation of the magnetic recording layer to enhance the coercive force Hc. In the present where the increase in recording density is proceeding, Ru that can easily enhance the coercive force is predominantly used as the underlayer.

Further, it is known that even if a material is the same, the function of a film changes depending on an atmospheric gas pressure in a film forming process. Patent Document 4 (JP-A-2002-197630) proposes a structure having, as an undercoat film of a perpendicular magnetic layer, a layer containing ruthenium and formed in a high-pressure argon atmosphere and a layer containing ruthenium and formed in a low-pressure argon atmosphere. In Patent Document 4, it is described that the layer containing ruthenium and formed in the low-pressure argon atmosphere (around 1 Pa) exhibits an effect for higher orientation of the magnetic layer and the layer containing ruthenium and formed in the high-pressure argon atmosphere (about 6 Pa to 10 Pa) exhibits an effect for finer grains of the magnetic layer.

Patent Document 1: JP-A-2003-77122
Patent Document 2: JP-A-2003-217107
Patent Document 3: JP-A-H07-334832
Patent Document 4: JP-A-2002-197630

DISCLOSURE OF THE INVENTION

Problem to be Solved by the Invention

In the meantime, recently, a further increase in areal information recording density of magnetic disks has been required so that the information recording capacity exceeding 160 GB is required per 2.5-inch magnetic disk adapted for use in a HDD or the like. In order to satisfy such a requirement, it is necessary to realize an information recording density exceeding 250 Gbit/inch$^2$. For enabling such a high recording density, it is necessary to improve the coercive force Hc and, for ensuring a predetermined S/N ratio and a predetermined resolution, it is necessary to improve the perpendicular orientation of magnetic grains.

With the increase in recording density, the flying height of magnetic heads has been extremely reduced and the rotational speed of magnetic disks has been increasing more and more. Therefore, a magnetic head is liable to be brought into contact with a magnetic disk due to unevenness or impact thereof. In view of this, the magnetic disk is generally provided with a hard protective layer and a lubricating layer with a low sliding resistance so as to be protected from the contact. However, it is necessary to improve the impact resistance of the magnetic disk itself.

Corrosion is one of problems conventionally present in magnetic recording media. The corrosion is typically a phenomenon in which a metal such as cobalt (Co) is precipitated from a lower layer and forms an oxide on a surface of a magnetic recording medium. If the corrosion occurs, unevenness is formed on the surface of the magnetic recording medium and thus there is a case where the flying of a head becomes unstable to make it difficult to read/write data. The mechanism of the occurrence of corrosion is not yet elucidated and thus a preventive measure is also not yet established. However, it is known that the corrosion is liable to occur at high temperature and humidity, and it is reported that the corrosion can be avoided using a high-density coating film or a coating film hard to be oxidized.

Herein, if ruthenium is used as an underlayer as described in Patent Document 3 or Patent Document 4, there is a problem that when the film is formed in a low-pressure atmosphere of about 3 Pa or less, the density of the film is improved, but the increase in recording density is difficult because the coercive force Hc is reduced. On the other hand, there is a problem that when the film is formed in a high-pressure atmosphere of about 6 to 10 Pa, the coercive force Hc is improved, but the impact resistance decreases and the occurrence of corrosion increases because the crystal structure becomes coarse.

It is therefore an object of this invention to propose a method of manufacturing a magnetic recording medium that can simultaneously realize an increase in recording density, high impact resistance, and prevention of corrosion, by proposing an underlayer that exhibits a high coercive force even if formed at a low gas pressure.

Means for Solving the Problem

As a result of conducting intensive studies for solving the above-mentioned problems, the present inventors have paid attention to the fact that although, in the case of Ru, the coercive force Hc is reduced when formed into a film at a low pressure while the impact resistance is reduced when formed into a film at a high pressure, this tendency changes if a material changes. Then, the present inventors have made a study on other materials that exhibit desired properties as an underlayer and, through further studies, have completed this invention.

A method of manufacturing a perpendicular magnetic recording medium according to this invention is characterized by forming, over a substrate, a nonmagnetic underlayer having a granular structure in which crystal grains are grown in a columnar shape, and a magnetic recording layer having a granular structure in which magnetic grains are grown in a columnar shape, wherein the underlayer is one of CoCr or CoCrX (X is a nonmagnetic substance), CoCr-oxide, and CoCrX-oxide, and a film forming gas pressure for the underlayer is 4 Pa or less. The film forming gas pressure for the underlayer is more preferably 0.5 Pa to 2 Pa.

According to the above-mentioned structure, it is possible to form the underlayer that exhibits a high coercive force even if formed at a low gas pressure and thus it is possible to manufacture a magnetic recording medium that can simultaneously realize an increase in recording density, high impact resistance, and prevention of corrosion.

The content of Cr is preferably more than 35 at % and not more than 55 at %. If Cr is 35 at % or less, the content of Cr between Co becomes small so that the crystal spacing between Co grains containing Cr is narrowed. Therefore, the magnetic crystal grain spacing of the magnetic recording layer epitaxially formed on such an underlayer is also narrowed. Thus, the interaction between the magnetic crystal grains of the magnetic recording layer increases to degrade the magnetic properties. On the other hand, if more than 55 at %, the crystal orientation of CoCr becomes tetragonal to degrade the crystal orientation of the magnetic recording layer so that the orientation of the magnetic recording layer cannot be improved.

When the underlayer is CoCrX, X may contain at least one of B, Ru, Ti, V, Cr, Zr, Nb, Mo, Hf, Ta, and W. If such a material is contained in the underlayer, B can facilitate miniaturization and separation, Ru can improve the crystal orientation, and the other materials can facilitate separation of the magnetic grains with respect to the magnetic recording layer.

An orientation control layer may be formed on the side closer to the substrate than the underlayer and a second orientation control layer with an amorphous structure containing at least one of C, Mo, Nb, Zr, B, and Ta may be formed between the orientation control layer and the underlayer. This second orientation control layer with the amorphous structure functions as a lattice spacing adjusting layer for slightly blocking lattice spacing chains between the orientation control layer and the underlayer and can improve the crystal orientation of the underlayer.

The orientation control layer is preferably NiW, NiCr, CuW, or Ti. These materials each have a hardness higher than Pd often used in conventional orientation control layers and thus improve the impact resistance and, since the texture is dense and the corrosion resistance is high, the corrosion can be easily prevented and, further, since the magnetic properties are not degraded even if heated, a heat treatment can be performed in a manufacturing process.

An alternative method of manufacturing a perpendicular magnetic recording medium according to this invention is characterized by comprising forming, over a substrate, an orientation control layer made of Ti and having a hcp structure, a second orientation control layer having an amorphous structure, a nonmagnetic underlayer made of one of CoCr or CoCrX (X is a nonmagnetic substance), CoCr-oxide, and CoCrX-oxide and having a granular structure in which crystal grains are grown in a columnar shape, the nonmagnetic underlayer formed at a film forming gas pressure of 4 Pa or less, and a magnetic recording layer having a granular structure in which magnetic grains are grown in a columnar shape.

If the Ti layer and the CoCr underlayer are in direct contact with each other, there is a possibility that the hcp structure of Co crystals is disturbed by the hcp structure of Ti so that the crystal orientation is degraded to reduce the coercive force. However, according to the above-mentioned method, by slightly interposing the second orientation control layer with the amorphous structure therebetween, the second orientation control layer slightly blocks lattice spacing chains between the orientation control layer and the underlayer and thus functions as a lattice spacing adjusting layer so that it is possible to prevent degradation in crystal orientation. Therefore, it is possible to form the underlayer that exhibits a high coercive force even if formed at a low gas pressure and thus it is possible to simultaneously realize an increase in recording density, high impact resistance, and prevention of corrosion.

An alternative method of manufacturing a perpendicular magnetic recording medium according to this invention is characterized by forming, over a substrate, an orientation control layer made of NiW and having a fcc structure, a nonmagnetic underlayer made of one of CoCr or CoCrX (X is a nonmagnetic substance), CoCr-oxide, and CoCrX-oxide and having a granular structure in which crystal grains are grown in a columnar shape, the nonmagnetic underlayer formed at a film forming gas pressure of 4 Pa or less, and a magnetic recording layer having a granular structure in which magnetic grains are grown in a columnar shape.

Although the lattice spacing chains between the orientation control layer and the underlayer can be blocked by providing a layer with an amorphous structure between the orientation control layer and the underlayer, there is a possibility that the crystal orientation decreases as the thickness of the layer with the amorphous structure increases and, following this, the coercive force decreases. However, if NiW is used as the orientation control layer, NiW has the fcc structure and thus does not disturb the hcp structure of Co crystals. Therefore, according to the above-mentioned method, it is possible to form, without forming the second orientation control layer with the amorphous structure, the underlayer that exhibits a high coercive force even if formed at a low gas pressure and thus it is possible to simultaneously realize an increase in recording density, high impact resistance, and prevention of corrosion.

A specific perpendicular magnetic recording medium according to this invention is characterized by comprising, over a substrate, an orientation control layer with a hcp structure, a second orientation control layer with an amorphous structure, an underlayer having a granular structure in which nonmagnetic crystal grains are grown in a columnar shape, and a magnetic recording layer having a granular structure in which magnetic grains are grown in a columnar shape, wherein the orientation control layer is Ti, and the underlayer is one of CoCr or CoCrX (X is a nonmagnetic substance), CoCr-oxide, and CoCrX-oxide. The second orientation control layer preferably has the amorphous structure containing at least one of C, Mo, Nb, Zr, B, and Ta.

According to the above-mentioned structure, since the underlayer can be formed at a low gas pressure, it is possible to form the underlayer having a high film density and adapted to exhibit a high coercive force. Particularly, the second orientation control layer having the amorphous structure slightly blocks lattice spacing chains between the orientation control layer and the underlayer and thus functions as a lattice spacing adjusting layer so that it is possible to improve the crystal orientation of the underlayer. By this, it is possible to simultaneously realize an increase in recording density, high impact resistance, and prevention of corrosion.

Another specific perpendicular magnetic recording medium according to this invention is characterized by comprising, over a substrate, an orientation control layer with a fcc structure, an underlayer having a granular structure in which nonmagnetic crystal grains are grown in a columnar shape, and a magnetic recording layer having a granular structure in which magnetic grains are grown in a columnar shape, wherein the orientation control layer is one of NiW, NiCr, and CuW, and the underlayer is CoCr, CoCrX (X is a nonmagnetic substance), CoCr-oxide, or CoCrX-oxide.

According to the above-mentioned structure, since the underlayer can be formed at a low gas pressure, it is possible to form the underlayer having a high film density and adapted to exhibit a high coercive force. By this, it is possible to simultaneously realize an increase in recording density, high impact resistance, and prevention of corrosion.

When the underlayer is CoCr-oxide or CoCrX-oxide, the oxide preferably contains at least one of $SiO_2$, $TiO_2$, and $Cr_2O_3$. By this, the lattice spacing of the underlayer can be properly adjusted and thus it is possible to improve the crystal orientation of the magnetic recording layer.

When the underlayer is CoCr-oxide or CoCrX-oxide, the content of the oxide is preferably 6 mol % or less. In other words, since the content of an oxide in the magnetic recording layer can be set to 8 to 15 mol %, it is preferable that the oxide content of the underlayer be smaller than that of the magnetic recording layer. Since the underlayer contains more Cr than the magnetic recording layer so as to be nonmagnetic, the lattice spacing therebetween can be decreased by reducing the oxide content.

The thickness of the underlayer is preferably 15 nm or more. This is because if the thickness of the underlayer is less than 15 nm, the coercive force Hc as a whole is extremely reduced. It is to be noted that if the thickness of the underlayer is set to 20 nm or more, although the coercive force Hc is not reduced, a further improvement is not observed so much. Therefore, the thickness of the underlayer is more preferably 15 to 20 nm.

The thickness of the second orientation control layer is preferably 0.5 nm or more and 1 nm or less. This is because if the thickness is less than 0.5 nm, it is extremely difficult to form the film. On the other hand, this is because if the second orientation control layer having the amorphous structure is thicker than 1 nm, the second orientation control layer blocks the crystal orientation of the orientation control layer with the fcc structure and thus the crystal orientation of the underlayer decreases to reduce the coercive force Hc.

Effect of the Invention

According to this invention, it is possible to form an underlayer that exhibits a high coercive force even if formed at a low gas pressure, and thus can manufacture a magnetic recording medium that can simultaneously realize an increase in recording density, high impact resistance, and prevention of corrosion.

BRIEF DESCRIPTION OF THE DRAWINGS

FIG. 2 is a diagram for explaining Examples and Comparative Examples.

FIG. 3 is graphs for explaining the test results of the Examples and the Comparative Examples.

FIG. 4 is a diagram showing changes in coercive force Hc when the compositions of an underlayer and an orientation control layer are changed.

FIG. 5 is diagrams for explaining cases where an underlayer contains an oxide.

Figure 1:
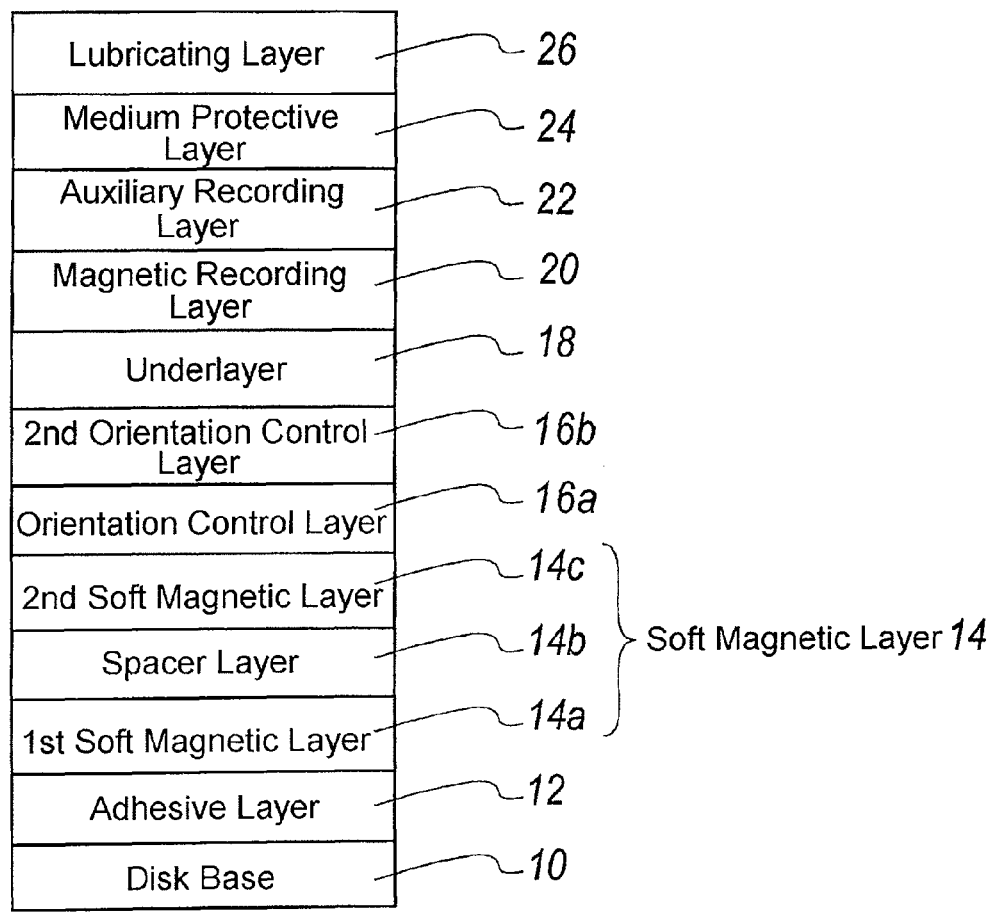
FIG. 1 is a diagram for explaining the structure of a perpendicular magnetic recording medium according to this embodiment.

DESCRIPTION OF SYMBOLS 10 disk base
12 adhesive layer
14 soft magnetic layer
14a first soft magnetic layer
14b spacer layer
14c second soft magnetic layer
16a orientation control layer
16b second orientation control layer
18 underlayer
20 magnetic recording layer
22 auxiliary recording layer
24 medium protective layer
26 lubricating layer

BEST MODE FOR CARRYING OUT THE INVENTION

A description will be given of an embodiment of a method of manufacturing a perpendicular magnetic recording medium according to this invention. FIG. 1 is a diagram for explaining the structure of a perpendicular magnetic recording medium according to this embodiment. Sizes, materials, specific numerical values, and so on shown in the following embodiment are only illustrative for facilitating understanding of the invention and are not intended to limit this invention unless otherwise specified.

The perpendicular magnetic recording medium shown in FIG. 1 comprises a disk base 10, an adhesive layer 12, a first soft magnetic layer 14a, a spacer layer 14b, a second soft magnetic layer 14c, an orientation control layer 16a, a second orientation control layer 16b, an underlayer 18, a magnetic recording layer 20, an auxiliary recording layer 22, a medium protective layer 24, and a lubricating layer 26. The first soft magnetic layer 14a, the spacer layer 14b, and the second soft magnetic layer 14c jointly form a soft magnetic layer 14.

First, an amorphous aluminosilicate glass was molded into a disk shape by direct press, thereby producing a glass disk. This glass disk was ground, polished, and chemically strengthened in sequence, thereby obtaining the smooth nonmagnetic disk base 10 in the form of a chemically strengthened glass disk.

Using an evacuated film forming apparatus, the layers from the adhesive layer 12 to the auxiliary recording layer 22 were formed in sequence on the obtained disk base 10 in an Ar atmosphere by a DC magnetron sputtering method and then the medium protective layer 24 was formed by a CVD method. Thereafter, the lubricating layer 26 was formed by a dip coating method. In terms of capability of uniform film formation, it is also preferable to use a film forming apparatus of a single sheet feed type. Hereinbelow, the structures and the method of manufacturing the respective layers will be described.

A Ti-alloy layer of 10 nm was formed as the adhesive layer 12. By forming the adhesive layer 12, the adhesion between the disk base 10 and the soft magnetic layer 14 can be improved and, therefore, it is possible to prevent stripping of the soft magnetic layer 14. As a material of the adhesive layer 12, use may be made of, for example, a CrTi alloy. In terms of practical use, the thickness of the adhesive layer is preferably set to 1 nm to 50 nm.

The soft magnetic layer 14 was formed by interposing the nonmagnetic spacer layer 14b between the first soft magnetic layer 14a and the second soft magnetic layer 14c so as to have AFC (antiferro-magnetic exchange coupling). By this, magnetization directions of the soft magnetic layer 14 can be aligned along a magnetic path (magnetic circuit) with high accuracy so that it is possible to reduce noise generated from the soft magnetic layer 14 because the perpendicular component in a magnetization direction is extremely reduced. Specifically, each composition of the first soft magnetic layer 14a and the second soft magnetic layer 14c was set to CoTaZr and the thickness thereof was set to 40 nm. The composition of the spacer layer 14b was set to Ru (ruthenium) and the thickness thereof was set to 1 nm.

The orientation control layer 16a has a function of protecting the soft magnetic layer 14 and a function of facilitating alignment of the orientation of crystal grains of the underlayer 18. The orientation control layer 16a can be formed using NiW, NiCr, or CuW having a fcc structure or Ti having a hcp structure.

The second orientation control layer 16b is formed between the orientation control layer and the underlayer and is provided by a layer of an amorphous structure containing at least one of C, Mo, Nb, Zr, B, and Ta. This second orientation control layer with the amorphous structure functions as a lattice spacing adjusting layer for slightly blocking lattice spacing chains between the orientation control layer and the underlayer and can improve the crystal orientation of the underlayer.

The underlayer 18 has a hcp structure and is a nonmagnetic layer having a granular structure in which crystal grains are grown in a columnar shape. Each crystal of the underlayer 18 is such that the (0001) plane is parallel to a surface of the disk base 10. This makes it possible to grow hcp crystals of the magnetic recording layer 20 in a granular structure. Therefore, as the crystal orientation of the underlayer 18 is enhanced, the orientation of the magnetic recording layer 22 can be improved.

The underlayer 18 can be any one of CoCr or CoCrX (X is a nonmagnetic substance), CoCr-oxide, and CoCrX-oxide.

The content of Cr in the underlayer 18 can be more than 35 at % and not more than 55 at %. If Cr is 35 at % or less, the content of Cr relative to the content of Co becomes small so that the crystal spacing between Co grains containing Cr is narrowed. Therefore, the magnetic crystal grain spacing of the magnetic recording layer epitaxially formed on such an underlayer is also narrowed. Thus, the interaction between magnetic crystal grains of the magnetic recording layer becomes strong and degrades the magnetic properties. On the other hand, if more than 55 at %, the crystal orientation of CoCr becomes tetragonal to degrade the crystal orientation of the magnetic recording layer so that the orientation of the magnetic recording layer cannot be improved. In this embodiment, $CoCr_{40}$ or $CoCr_{40}Ru_{10}$ is used.

At least one of B, Ru, Ti, V, Cr, Zr, Nb, Mo, Hf, Ta, and W can be contained as the nonmagnetic substance X. If such a material is contained in the underlayer, B can facilitate miniaturization and separation, Ru can improve the crystal orientation, and the other materials can facilitate separation of magnetic grains with respect to the magnetic recording layer.

$SiO_2$, $TiO_2$, or $Cr_2O_3$ can be suitably used as an oxide. For example, $SiO_2$ can achieve miniaturization of CoCr, $TiO_2$ can achieve isolation/separation, and so on. In this manner, it is possible to improve the crystal orientation of the magnetic recording layer 20. Further, by adjusting the content of the oxide, it is possible to properly adjust the lattice spacing of the underlayer and thus to improve the crystal orientation of the magnetic recording layer.

Particularly, the content of the oxide is preferably 6 mol % or less. In other words, since the content of an oxide in the magnetic recording layer 20 can be set to 8 to 15 mol %, it is preferable that the oxide content of the underlayer 18 be smaller than that of the magnetic recording layer 20. Since the underlayer 18 contains more Cr than the magnetic recording layer 20 so as to be nonmagnetic, the lattice spacing therebetween can be decreased by reducing the oxide content.

The thickness of the underlayer 18 is preferably 15 nm or more. This is because if the thickness of the underlayer 18 is less than 15 nm, the coercive force Hc as a whole is extremely reduced. It is to be noted that if the thickness of the underlayer 18 is set to 20 nm or more, although the coercive force Hc is not reduced, a further improvement is not observed so much. Therefore, the thickness of the underlayer is more preferably 15 to 20 nm.

There is a case where a nonmagnetic granular layer called an onset layer or a miniaturization facilitating layer is provided as an initial growth layer with a granular structure of a magnetic recording layer. However, the onset layer is formed on a Ru underlayer and is formed to a thickness of about 1 nm because it has a role as the initial growth layer. In contrast, the underlayer according to this embodiment is rather a substitute for the Ru underlayer and has a role of improving the crystal orientation, thus requiring a thickness of 15 to 20 nm as described above because of its role. In the case of Ru, it aims to align the c-axes of hcp crystals in a perpendicular direction and to allow such crystal orientation to be inherited or continued by the c-axes (easy magnetization axes) of Co crystals of the magnetic recording layer. On the other hand, in the case of the CoCr nonmagnetic underlayer with the granular structure according to this embodiment, the underlayer itself has both Co crystals and the granular structure and thus can allow the magnetic recording layer to inherit or continue not only the c-axis orientation, but also granular separation or isolation. In terms of this point, it can be said that the controllability by the underlayer is higher than that by the Ru underlayer.

The magnetic recording layer 20 has a granular structure in which a nonmagnetic substance (mainly an oxide) is segregated around magnetic grains grown in a columnar shape, thereby forming grain boundaries. Using a hard magnetic target made of CoCrPt containing titanium oxide ($TiO_2$) as an oxide, a CoCrPt—$TiO_2$ hcp crystal structure of 15 nm was formed as the magnetic recording layer 20. The oxide was segregated around the magnetic substance to form grain boundaries and magnetic grains formed a columnar granular structure. These magnetic grains were epitaxially grown continuously from the granular structure of the underlayer 18. As the oxide, use can be suitably made of oxygen ($O_2$), silicon oxide ($SiO_2$), aluminum oxide ($Al_2O_3$), titanium oxide ($TiO_2$), zirconium oxide ($Zr_2O_3$), chromium oxide ($Cr_2O_3$), tantalum oxide ($Ta_2O_5$), or the like. The composition ratio of the oxide in the target for forming the magnetic recording layer can be set to a range of 8 to 15 mol %.

A thin film (continuous layer) adapted to exhibit high perpendicular magnetic anisotropy was formed on the granular magnetic layer as the auxiliary recording layer 22. The auxiliary recording layer 22 has a CGC (Coupled Granular Continuous) structure. This makes it possible to add high heat resistance of the continuous film in addition to high-density recordability and low noise of the granular layer. The composition of the auxiliary recording layer 22 was set to CoCrPtB.

The medium protective layer 24 was formed by film formation of carbon by the CVD method while maintaining a vacuum. The thickness of the medium protective layer 24 was about 5 nm. The medium protective layer 24 is a protective layer for protecting the perpendicular magnetic recording layer from an impact of a magnetic head. Since, in general, carbon formed into a film by the CVD method is improved in film hardness as compared with that by the sputtering method, it is possible to protect the perpendicular magnetic recording layer more effectively against the impact from the magnetic head.

The lubricating layer 26 was formed of PFPE (perfluoropolyether) by the dip coating method. The thickness of the lubricating layer 26 was about 1 nm.

In the above-mentioned structure, in the case where the orientation control layer 16a made of particularly Ti and having the fcc structure is formed, it is preferable to form the second orientation control layer 16b having the amorphous structure. If the Ti layer and the CoCr underlayer are in direct contact with each other, there is a possibility that the hcp structure of the Co crystals is disturbed by the hcp structure of Ti so that the crystal orientation is degraded to reduce the coercive force. However, by slightly interposing the second orientation control layer 16b with the amorphous structure therebetween, the second orientation control layer 16b slightly blocks lattice spacing chains between the orientation control layer 16a and the underlayer 18 and thus functions as a lattice spacing adjusting layer so that it is possible to prevent degradation in crystal orientation. Therefore, it is possible to form the underlayer that exhibits a high coercive force even if desposition is made at a low gas pressure and thus it is possible to simultaneously realize an increase in recording density, high impact resistance, and prevention of corrosion.

Although the lattice spacing chains can be blocked by providing the second orientation control layer 16b with the amorphous structure between the orientation control layer 16a and the underlayer 18, there is a possibility that the crystal orientation decreases as the thickness of the second orientation control layer 16b increases and, following this, the coercive force decreases. Therefore, the thickness of the second orientation control layer 16b with the amorphous structure is preferably set to 0.5 to 1 nm.

On the other hand, in the case where the orientation control layer 16a having the fcc structure is formed, since the hcp structure of the Co crystal is not disturbed, the underlayer 18 can be formed directly thereon. Therefore, if NiW is used as the orientation control layer 16a, since NiW has the fcc structure, it is possible to form, without forming the second orientation control layer 16b with the amorphous structure, the underlayer 18 that exhibits a high coercive force even if desposition is made at a low gas pressure and thus it is possible to simultaneously realize an increase in recording density, high impact resistance, and prevention of corrosion.

Through the manufacturing processes described above, the perpendicular magnetic recording medium was obtained. Hereinbelow, the effectiveness of this invention will be described using Examples and Comparative Examples.

FIG. 2 is a diagram for explaining Examples and Comparative Examples, wherein there is shown the relationship between the underlayer forming gas pressure and the coercive force Hc in Examples using $CoCr_{40}$ as an underlayer and Comparative Examples using Ru as an underlayer. In FIG. 2, an orientation control layer 16a is NiW, Ti, or CuW and a second orientation control layer 16b is in the form of a coating film made of C. In Comparative Examples 6 and 7, the compositions are the same as those in the Examples, but the underlayer forming gas pressure is greater than 4 Pa, and therefore, Comparative Examples 6 and 7 are shown as Comparative Examples.

FIG. 3 shows graphs for explaining the test results of the Examples and the Comparative Examples, wherein FIG. 3(a) is in the case of a CoCr underlayer and FIG. 3(b) is in the case of a Ru underlayer. As shown in FIG. 3(a), in the case of the CoCr underlayer, the coercive force Hc rapidly increases at low gas pressures, reaches a peak at a position of only 0.7 Pa, and then gradually decreases as the gas pressure increases. The coercive force Hc is, at a position of 4 Pa, equal to that at a position of 0 Pa and then decreases further. That is, the coercive force Hc can be improved by the gas pressure at 0 Pa to 4 Pa.

The impact property tends to decrease on the whole as the gas pressure increases, and falls below 400 counts as a criterion at 4.2 Pa. This shows that a denser film is formed as the gas pressure decreases, while the texture becomes coarser as the gas pressure increases.

On the other hand, as shown in FIG. 3(b), in the case of the Ru underlayer, the coercive force Hc tends to gradually increase as the gas pressure increases, and tends to continually increase in a measured range up to 6 Pa. The impact property tends to decrease on the whole as in the case of the CoCr underlayer and falls below 400 counts as a criterion at 4.8 Pa.

Herein, comparison is made between FIG. 3(a) and FIG. 3(b). As a result, in the dependence of the coercive force Hc on the gas pressure, the coercive force Hc tends to rapidly increase and then decrease in the case of the CoCr underlayer, while it tends to increase on the whole in the case of the Ru underlayer. This can be said to be a significant difference. Currently, Ru underlayers are widely employed in perpendicular magnetic recording media and, as shown in JP-A-2002-197630 (Patent Document 4) described above, the behavior of Ru with respect to the film forming gas pressure is known. However, it is totally unknown that when a CoCr nonmagnetic layer is used as an underlayer, it exhibits the magnetic property opposite to that of a Ru underlayer as described above. It is seen that if this property is used, it is possible to obtain high magnetic properties and high impact resistance just when the gas pressure is low.

That is, it has been confirmed that, by applying the method according to this embodiment using the underlayer with the above-mentioned composition, it is possible to form the underlayer that exhibits a high coercive force even if deposition is made at a low gas pressure. This makes it possible to manufacture a magnetic recording medium that can simultaneously realize an increase in recording density, high impact resistance, and prevention of corrosion.

FIG. 4 is a diagram showing changes in coercive force Hc when the compositions of an underlayer and an orientation control layer are changed. In this event, Examples are such that a CoCr underlayer contains Cr at more than 35 at % and not more than 55 at %, and a Comparative Example has a condition other than that. The film forming gas pressure for the underlayers is constant.

As shown in FIG. 4, when the content of Cr is changed, the coercive force Hc tends to increase as the content of Cr increases. Particularly when Cr is 35 at % or less, the coercive force Hc extremely decreases to make it impossible to obtain a magnetic recording medium. When the content of Cr becomes small, the content of Cr between Co becomes small so that the crystal spacing between Co grains containing Cr is narrowed. Therefore, the magnetic crystal grain spacing of a magnetic recording layer epitaxially formed on such an underlayer is also narrowed. Thus, it is considered that the interaction between magnetic crystal grains of the magnetic recording layer increases to degrade the magnetic properties. On the other hand, if more than 55 at %, the crystal orientation of CoCr becomes tetragonal to degrade the crystal orientation of a magnetic recording layer so that the orientation of the magnetic recording layer cannot be improved. Therefore, although a numerical value is not shown in FIG. 4, it cannot be treated as an Example when the content of Cr is more than 55 at %.

FIG. 5 shows diagrams for explaining cases where an underlayer contains an oxide, wherein FIG. 5(a) shows the cases where an underlayer is a single layer, FIG. 5(b) show the cases where an underlayer comprises two layers and the second underlayer contains an oxide, and FIG. 5(c) is a graph contrasting them. $SiO_2$, $TiO_2$, or $Cr_2O_3$ was contained at 6 mol % as the oxide.

When the oxide is contained in CoCr of the underlayer, the oxide is segregated around CoCr crystal grains to form grain boundaries. By this, separation of the CoCr crystal grains is facilitated so that it is possible to allow a magnetic recording layer to inherit the granular separation or isolation. Therefore, as seen from the figures, the coercive force Hc is improved in Examples 15 to 20 in which the oxide is contained, as compared with Examples 1 to 5 (see FIG. 4).

Further, as shown in Examples 18 to 20, by dividing an underlayer 18 into a first underlayer and a second underlayer and making the first underlayer of CoCr and the second underlayer of CoCr-oxide, the coercive force Hc can be further improved.

With respect to the impact resistance, as a result of a comparison between Examples 15 to 20 and Example 3 in which the film formation was performed at 0.7 Pa likewise, no large change is observed. This means that while the impact resistance is affected by the texture density and the texture density is affected by the film forming gas pressure, the presence or absence of the oxide does not affect it. In a contrast between Examples 15 to 17 and Examples 18 to 20, no difference in impact resistance is observed. It is considered that this is because the impact resistance is affected by the surface hardness of the underlayer and thus, even if the underlayer comprises two layers, the same impact resistance can be exhibited as long as the conditions on the substrate surface side are the same.

Herein, when an underlayer is formed by two Ru layers, it is known that even if the lower layer is formed at a low gas pressure (about 4 Pa) and the upper layer is formed at a high gas pressure (about 6 to 10 Pa), the coercive force can be improved as compared with a single Ru layer. It is considered that this is because gaps between crystal grains increase by the film formation of Ru at the high gas pressure so that isolation/separation of crystal grains of a magnetic recording layer as its upper layer proceeds. However, it is known that, because of the increase in the gaps, the film strength is lowered due to the film formation of Ru at the high gas pressure.

In contrast, according to this embodiment, the isolation/separation of the underlayer is achieved by mixing the oxide, i.e. not by the gas pressure, so that the improvement in coercive force Hc can be realized. Therefore, a high coercive force Hc can be obtained while the underlayer is formed at a low gas pressure of 4 Pa or less, and further, the texture can be made dense so that it is possible to simultaneously realize high impact resistance and prevention of corrosion.

While the preferred embodiment of this invention has been described with reference to the accompanying drawings, it is needless to say that this invention is not limited thereto. It is apparent that a person skilled in the art can think of various changes and modifications in the category described in claims and it is understood that those also naturally belong to the technical scope of this invention.

Industrial Applicability

This invention can be used as a method of manufacturing a perpendicular magnetic recording medium adapted to be mounted in a HDD (hard disk drive) of the perpendicular magnetic recording type or the like.

The invention claimed is:
1. A perpendicular magnetic recording medium comprising:
a substrate,
over a main surface of the substrate, a soft magnetic layer or layers;
over the soft magnetic layer, a first orientation control layer with a hcp structure and, over the first orientation control layer, a second orientation control layer with an amorphous structure,
over the second orientation control layer, an underlayer having a granular structure in which nonmagnetic crystal grains are grown in a columnar shape, and
over the underlayer, a magnetic recording layer having a granular structure in which magnetic grains are grown in a columnar shape,
wherein said first orientation control layer comprises Ti,
said second orientation layer is formed between the first orientation control layer and the under layer and functions as a lattice spacing adjusting layer for blocking lattice spacing chains between the first orientation control layer and the underlayer, and said underlayer comprises one of CoCr or CoCrX (X is a nonmagnetic substance), CoCr-oxide, and CoCrX-oxide.

2. A perpendicular magnetic recording medium according to claim 1, wherein said second orientation control layer has the amorphous structure containing at least one of C, Mo, Nb, Zr, B, and Ta.

3. A perpendicular magnetic recording medium according to claim 1, wherein the content of said Cr in said underlayer is 35 at % or more and 55 at % or less.

4. A perpendicular magnetic recording medium according to claim 1, wherein, when said underlayer is CoCr-oxide or CoCrX-oxide, said oxide contains at least one of $SiO_2$, $TiO_2$, and $Cr_2O_3$.

5. A perpendicular magnetic recording medium according to claim 4, wherein, when said underlayer is CoCr-oxide or CoCrX-oxide, the content of said oxide is 6 mol % or less.

6. A perpendicular magnetic recording medium according to claim 1, wherein said underlayer has a thickness of 15 nm or more.

7. A perpendicular magnetic recording medium according to claim 1, wherein said second orientation control layer has a thickness of 0.5 nm or more and 1 nm or less.

8. A perpendicular magnetic recording medium according to claim 1, wherein, when said underlayer is said CoCrX, said X contains at least one of B, Ru, Ti, V, Cr, Zr, Nb, Mo, Hf, Ta, and W.

9. A perpendicular magnetic recording medium according to claim 1, wherein an adhesive layer is between said substrate and said soft magnetic layer.

* * * * *